(No Model.) 4 Sheets—Sheet 1.
J. C. RUBY.
MACHINE FOR MOLDING CONFECTIONS.
No. 457,372. Patented Aug. 11, 1891.
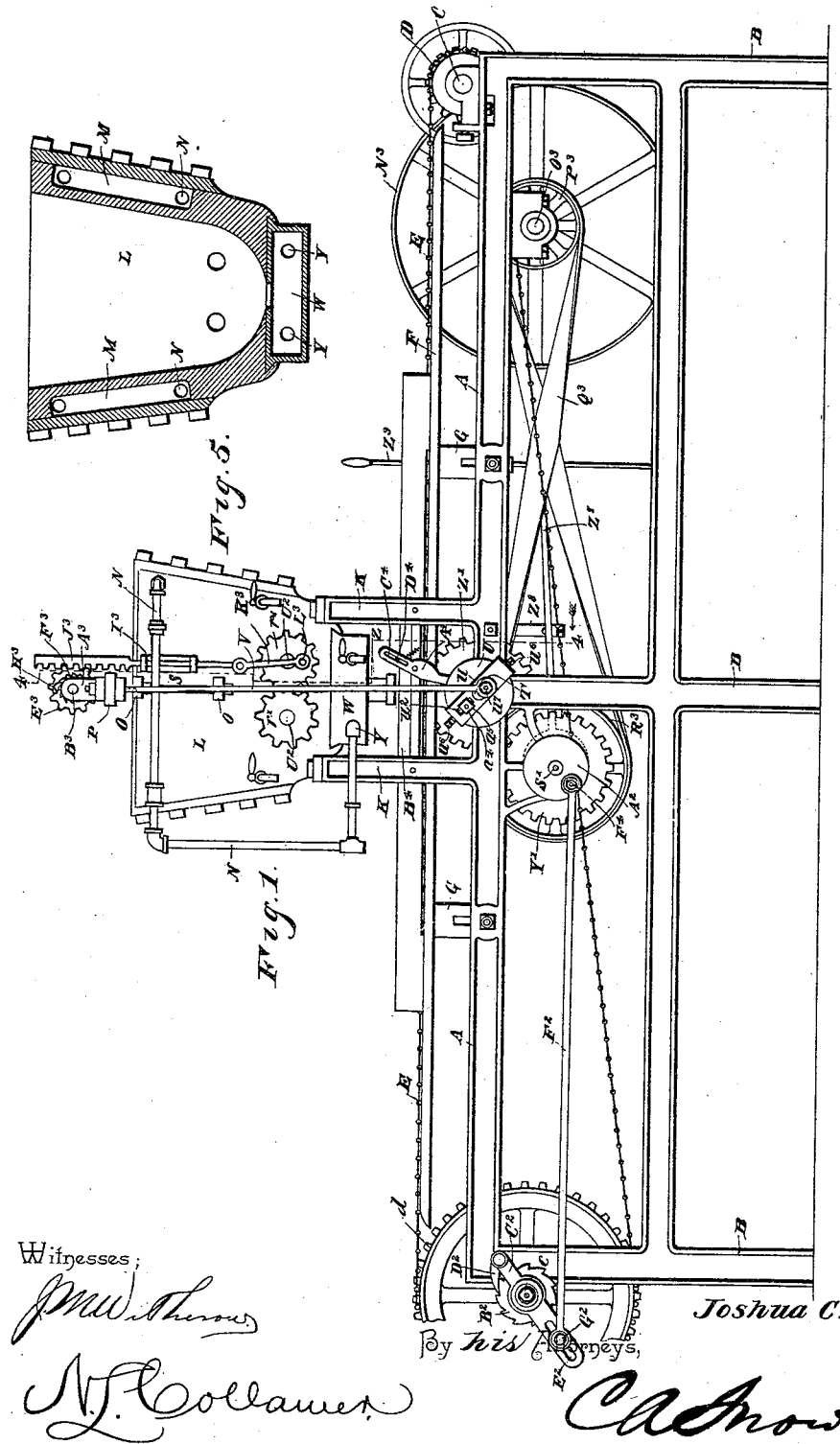
Witnesses:
Inventor,
Joshua C. Ruby,
By his Attorneys,

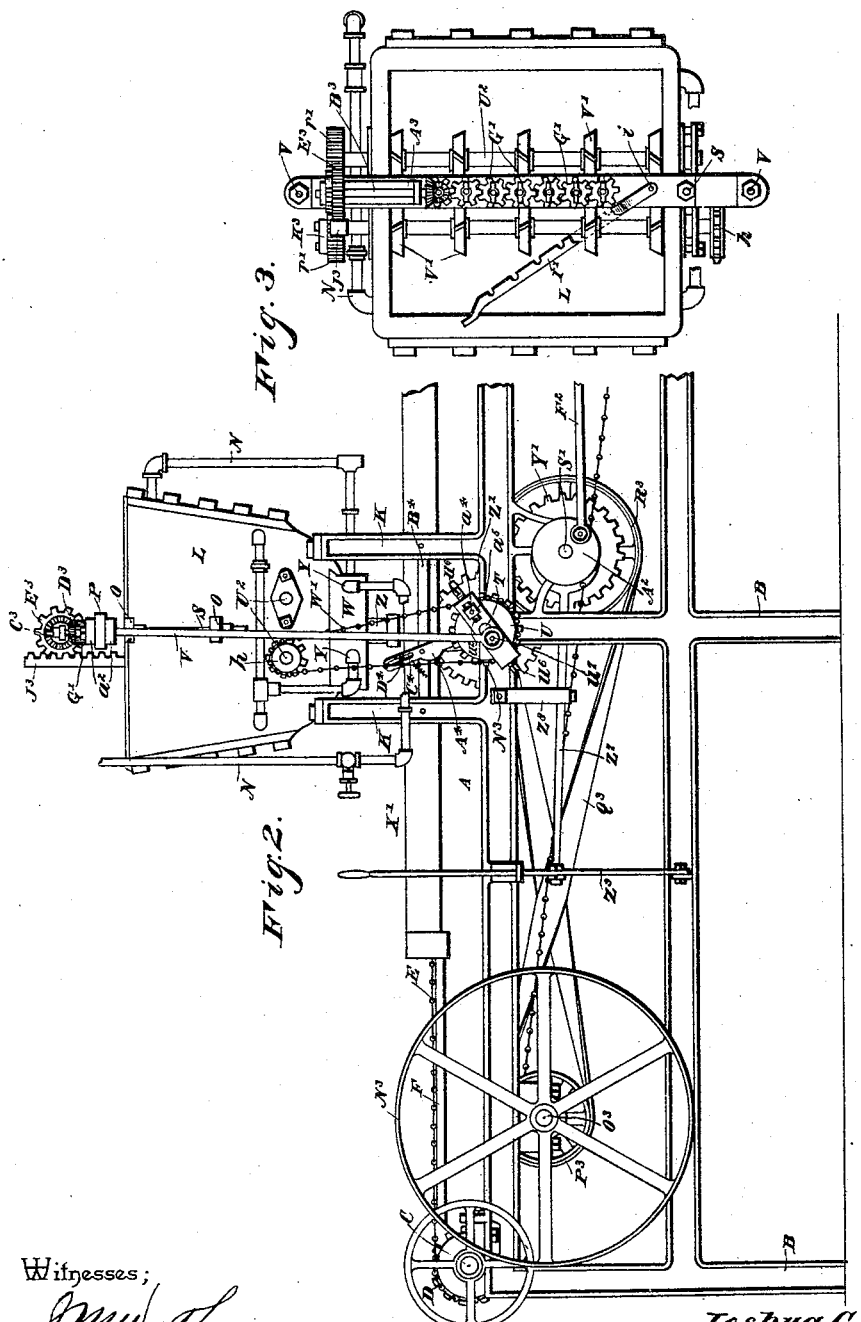

(No Model.) 4 Sheets—Sheet 3.
J. C. RUBY.
MACHINE FOR MOLDING CONFECTIONS.
No. 457,372. Patented Aug. 11, 1891.
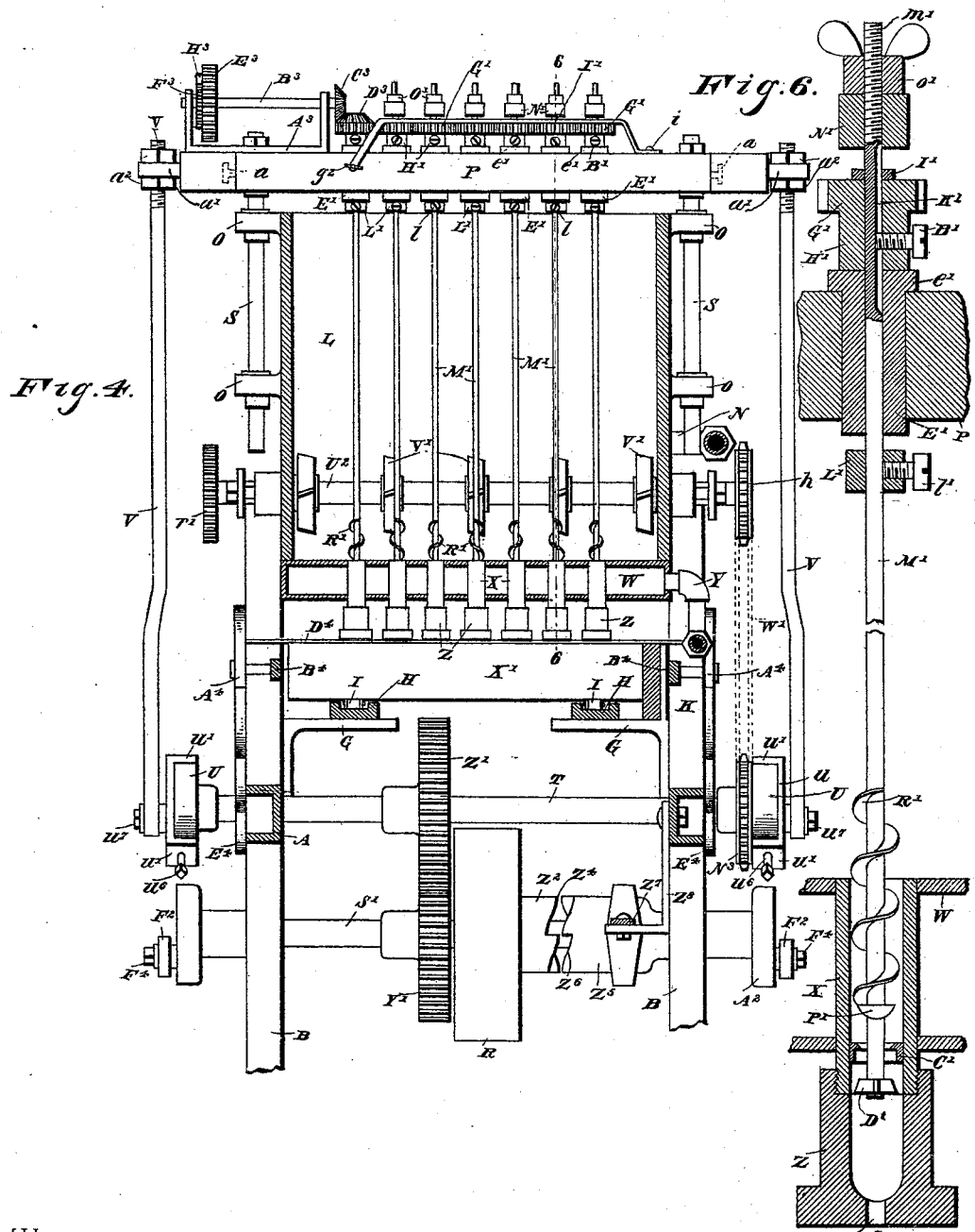
Witnesses;
Inventor
Joshua C. Ruby.
By his Attorneys, (No Model.) 4 Sheets—Sheet 4.
J. C. RUBY.
MACHINE FOR MOLDING CONFECTIONS.

No. 457,372. Patented Aug. 11, 1891.

Witnesses:

Inventor,
Joshua C. Ruby,
By his Attorneys,

UNITED STATES PATENT OFFICE.

JOSHUA CLAY RUBY, OF PHILADELPHIA, PENNSYLVANIA.

MACHINE FOR MOLDING CONFECTIONS.

SPECIFICATION forming part of Letters Patent No. 457,372, dated August 11, 1891.

Application filed December 4, 1890. Serial No. 373,589. (No model.)

*To all whom it may concern:*

Be it known that I, JOSHUA CLAY RUBY, a citizen of the United States, residing at Philadelphia, in the county of Philadelphia and State of Pennsylvania, have invented a new and useful Machine for Molding Confections, of which the following is a specification.

This invention relates to machines for molding plastic substances, such as candies, batter, and the like; and the object of the same is to provide improvements upon machines of a similar nature heretofore constructed.

To this end the invention consists of the details of construction and combination of devices hereinafter more fully set forth, and particularly pointed out in the claims.

Figure 7:
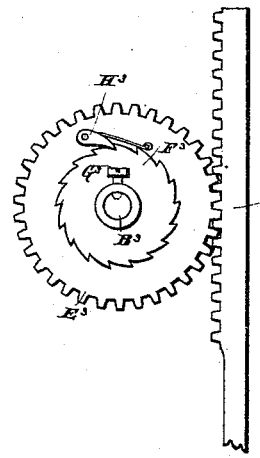
Figure 8:
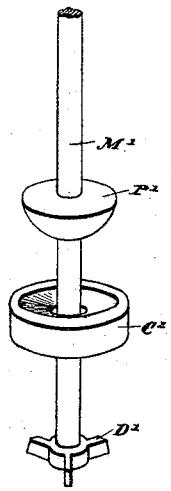
Figure 9:
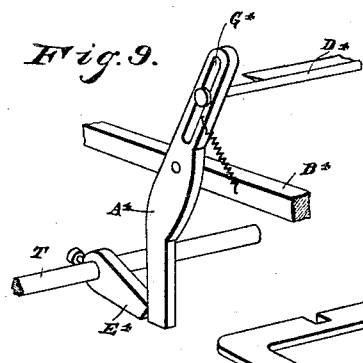
Figure 10:
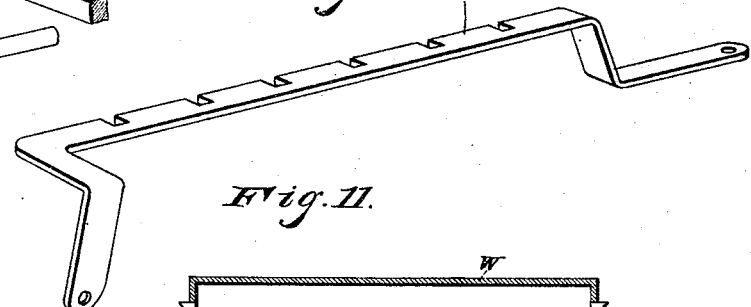
Figure 11:
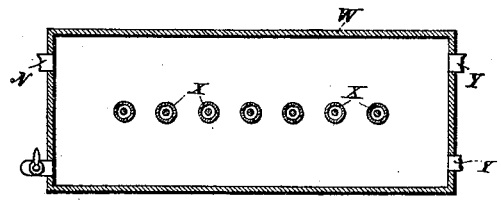

In the accompanying drawings, Figure 1 is a rear elevation of my improved machine. Fig. 2 is a front elevation thereof, partly broken away. Fig. 3 is a plan view of the hopper. Fig. 4 is an enlarged section on the line 4 4 of Fig. 1. Fig. 5 is a transverse section of the hopper. Fig. 6 is an enlarged transverse section on the line 6 6 of Fig. 4. Fig. 7 is an enlarged detail in elevation of the plunger-rotating gear and its actuating-pawl. Fig. 8 is a perspective detail of the lower end of the plunger-rod. Fig. 9 is a perspective detail of the cutter-bar with one of its operating-levers and the cam for the same. Fig. 10 is a perspective detail of the retaining-bar. Fig. 11 is a horizontal section through the chamber below the hopper.

Referring to the said drawings, the letter A designates a rectangular frame, which is provided with supporting-legs B. Near opposite ends of the frame A are journaled transverse shafts C and $c$, which are respectively provided with sprocket-wheels D and $d$.

E represents a pair of endless chains, which connect the wheels on one shaft with the wheels on the opposite shaft, the said chains thereby extending throughout the entire length of the frame A, as shown.

K represents a pair of standards, which are arranged on opposite sides of the frame A, at or near the center of the same, and have their upper ends extending a suitable distance above said frame. To these standards is secured a hopper L, which is provided on its sides with water-compartments M, with which communicate pipes N, and by means of which a constant circulation of water may be maintained in said compartments for the purpose of keeping the contents of the hopper hot and in fluid or semi-fluid condition. On the ends of the hopper are guiding ears or lugs O, having vertical aligned openings.

P represents a cross-head, which is arranged across the upper side of the hopper, has its ends projecting beyond the ends thereof, and is provided with a pair of vertical depending guide-rods S, which work through the openings in said lugs O.

Through the frame A between the standards K is journaled a transverse shaft T, which is provided at its ends with disk-shaped wheels U, having bolts $a^4$ in their bodies. Spanning each disk is a yoke $u$, whose ends $u'$ are turned over the edges of the disk and whose bodies are provided with slots $u^2$, engaging said bolts $a^4$, the latter being provided with nuts $a^5$, as shown. Through the ends of the yokes are long set-screws $u^6$, which bear upon the edges of the disks and by means of which the yokes can be adjusted transversely across the disks, and each yoke is provided with a crank-pin $u^7$. By this means the crank-pins are adjusted relatively to the transverse shaft T, as the yokes $u$ are adjusted by means of the set-screws $u^6$, and after such adjustment the nuts $a^5$ are turned home upon the bolts $a^4$, so as to clamp the yokes $u$ tightly against the outer faces of the disks U.

V V represent pitmen, which have their lower ends connected to said crank-pins $u^7$ and their upper ends threaded, as at $v$. The ends of the cross-head P are provided with eyes $a'$ swivelly connected, as at $a$, with the cross-head, and through these eyes pass the threaded ends $v$ of the pitmen, nuts $a^2$ above and below the eyes adjustably connecting the pitmen therewith. By this means the connection between the cross-head and the pitmen can be adjusted, and when the shaft T rotates and the pitmen are moved a vertical reciprocating motion will be given to the cross-head P, as will be understood.

The bottom of the hopper is provided with a longitudinal closed chamber W.

X represents a series of short cylindrical tubes which extend from the bottom of the hopper completely through and below the chamber W, as best seen in Fig. 6, and hot-water pipes Y, communicating with the pipes N, above mentioned, open into the said chamber W, so that as the hot water flows around the pipes X they will be kept constantly hot and any plastic material which may have descended thereinto from the hopper L will be maintained in a soft state. To the lower end of each tube X is screwed a cup Z, having a reduced discharge-opening A' at its lower end. Through the hopper and through each tube X extends a vertical plunger-rod M', having secured to its body a semi-spherical valve P', and carrying at its lower end a triangular-shaped foot D'. Between this valve and foot is located a sliding valve C', which fits closely within the pipe X and within the interior of the cup Z. The opening in this sliding valve flares upwardly, so as to form a valve-seat for the semi-spherical valve P', but the opening is of a size to prevent the passage therethrough of the foot D'. By this arrangement when the plunger-rod M' descends the valve will be closed, the sliding valve moving downwardly; but when the rod ascends the foot will draw the sliding valve upwardly without closing the opening through it. Upon the body of the plunger-rod, above the semi-spherical valve P', is arranged a worm R'. The upper end of each plunger-rod passes through the cross-head P, and is threaded, as shown at $m'$. Upon this threaded portion is screwed a nut N', above which is a jamb-nut O'. Below these nuts the plunger-rod is provided with a groove K', and mounted loosely on the rod is a gear-wheel G', having a depending hub H', through which passes a set-screw B', whose tip takes into said groove. Below the hub H' is a tubular bearing E', having an enlarged upper end $e'$, which rests on the top of the cross-head P, the body of the bearing passing through said cross-head. In this bearing the plunger-rod is permitted to turn or to slide, while the bearing prevents the gear G' from moving downwardly with the rod. Pivoted at $i'$ to the top of the cross-head P is a retaining-bar I', having notches which embrace each of the plunger-rods just above the gears G', and the free end of this retaining-bar is secured to one face of the cross-head by a thumb-screw $g^2$. This retaining-bar prevents the gear G' from moving upwardly with the rod, the tip of the set-screw B' sliding in the groove K', as will be understood. Upon the plunger-rod, below the lower end of the bearing, is mounted a collar L', said collar being adjustable thereon by means of a set-screw $l'$, all as shown in Fig. 6. Mounted upon the cross-head is a yoke $A^3$, to which is journaled a horizontal shaft $B^3$, carrying on one end a bevel-gear $C^3$, which meshes with another bevel-gear $D^3$, which is splined on one of the plunger-rods M', and by this means a turning of the shaft $B^3$ will impart rotation to all the plunger-rods, each one in a different direction from the two next adjacent.

Referring now to Fig. 7, $E^3$ is a gear-wheel mounted loosely on the shaft $B^3$, and adjacent to this wheel a ratchet-wheel $F^3$ is secured on the shaft by a set-screw $G^3$, a spring-actuated pawl $H^3$ being pivoted to the gear $E^3$ and engaging the teeth of the ratchet. In guides $I^3$ on the front end of the hopper L moves a rack-bar $J^3$, whose teeth engage those of the gear $E^3$, and pivotally connected to the lower end of this rack-bar is a pitman $K^3$, which is connected to a crank-pin $L^3$, seated in the face of one of a pair of intermeshing gear-wheels $r'$. Journaled longitudinally through the hopper L is a pair of shafts $U^2$, upon one end of which the said gears $r'$ are keyed. The rear end of one of these shafts extends through the end of the hopper and is provided with a sprocket-wheel $h$, which is connected by a sprocket-chain W' with a sprocket-wheel $N^3$ on the shaft T. The shafts $U^2$ are provided inside the hopper with stirring-paddles V', by means of which the material in the hopper is agitated. Through this mechanism the rotation of the shaft T drives the stirring-paddles, and the crank-wheel on the shaft of one of said stirrers reciprocates the rack-bar $J^3$ vertically. The downward movement of the rack-bar causes the gear $E^3$, the shaft $B^3$, the gears G', and the several plunger-rods to rotate partially, whereby the worms R' are turned in the proper direction to force the material into the tubes X, and this movement is timed relatively to the vertical reciprocations of the cross-head, so that as this feeding of the material takes place the cross-head is rising and the sliding valve C' is open. This upward movement of the cross-head and consequently of the gear $E^3$, while the rack-bar $J^3$ is moving downward naturally accelerates the motion of said gear, so that although the plunger-rods are rising in the tubes X their worms are rotating so rapidly that the material is fed downwardly into the tubes faster than the plungers rise.

F represents a table-frame, which is supported at a suitable height above the frame A by means of brackets or standards G, and on this table-frame are mounted rails H, on which move supporting-rollers I of the tray X', which tray is connected to the endless chains E. The said chains and the shafts C $c$ and sprocket-wheels D $d$ constitute a carrier which is adapted to move the tray longitudinally under the hopper.

The letter $N^3$ designates the main driving-wheel, which is mounted on the main shaft $O^3$, and this shaft has a wheel $P^3$, connected by a belt $Q^3$ with a pulley $R^3$ on the shaft S'. This pulley is mounted loosely on the shaft S', and has secured to it a clutch member $Z^2$, having teeth $Z^4$. Another clutch member $Z^5$ is splined on this shaft in a manner well understood, and has teeth $Z^6$, adapted to engage those on the first member. The second member $Z^5$ is moved longitudinally by a lever $Z^7$, pivoted to a bracket $Z^8$ and connected at its other end to a hand-lever $Z^9$. This lever stands within reach of the operator, and by moving it in the proper direction the clutch members $Z^2$ and $Z^5$ can be disengaged and the rotation of the shaft $S'$ stopped. Upon said shaft is a large gear $Y'$, which meshes with a gear $Z'$, mounted on the shaft T, by which intermeshing gears motion is communicated from the shaft $S'$ to the shaft T.

$B^2$ represents a ratchet-wheel, which is secured rigidly near one end of a shaft $c$. On each projecting end of said shaft is loosely mounted a rocking lever $C^2$, which has a pawl $D^2$, pivoted to its upper end and engaging said ratchet-wheel, and also has a slot $E^2$ in its lower end.

$F^2$ represents a pitman, which is connected to said rocking lever by a bolt $G^2$, which is adjustably mounted in the slot $E^2$ thereof, and the other end of this pitman is connected to the crank-pin $F^4$ of a crank-wheel $A^2$, of which there is one at each end of the shaft $S'$.

From the foregoing it will be understood that the pitman communicates rocking motion to the lever $C^2$ and causes the pawl $D^2$ to partially turn the ratchet-wheel $B^2$ at each forward movement of the lever, thereby giving an intermittent rotary motion to the shaft C, and hence an intermittent longitudinal motion to the tray $X'$. The machine is so timed that this forward motion of the tray will occur between the discharges of the plungers, as is obviously necessary.

$A^4$ are levers pivoted to the cross-bars $B^4$, which connect the standards K, and the upper ends of these levers are provided with slots $C^4$, which slots receive the ends of a cutter-bar $D^4$, which extends across the top of the tray $X'$. Upon the shaft T are cams $E^4$, which are so timed that just after the cross-head has descended and the plungers have discharged into the tray these cams will strike the lower ends of the levers $A^4$ and cause them to suddenly move the cutter-bar $D^4$ across the mouths $A'$ of the cups Z, thereby severing the material at that point for an obvious purpose.

The operation of this machine is as follows: Power being applied to the main driving-wheel $N^3$ and thence communicated to the shaft $S'$, the pitman $F^2$ causes the tray $X'$ to move intermittently. The intermeshing gears $Y'$ $Z'$ drive the shaft T, and this, by the pitman V, causes the cross-head P to reciprocate vertically and alternately with the movements of the tray. At the same time the chain $W'$, leading from a sprocket-wheel on the shaft T, operates the stirrer-shafts $U^2$, one of which causes the rack $J^3$ to reciprocate oppositely to the movements of the cross-head. The gear $E^3$, which is carried by the cross-head, meshes with the rack $J^3$, and through the ratchet $F^3$ causes an intermittent rotation of the shaft $B^3$ in one direction, which shaft, being connected by gearing with each of the plunger-rods, causes them to rotate properly. The vertical movements of each plunger-rod cause the sliding valve $C'$ to eject the soft material from the cup Z on the downward movement of the plunger, and to allow the cup to be filled on the upward movement; but as the thickness of the material would sometimes prevent its flowing through the sliding valve as the latter moves upwardly, the spiral action of the worm $R'$, which occurs at this moment, causes the material to be forced downwardly, and therefore accomplishes the successful operation of the device. After the material has been ejected into the tray the cams $E^4$ cause the levers $A^4$ to move, and the cutter-bar $D^4$ is moved across the mouths of the cups to completely sever the material from the plungers and prevent the gumming of the machine.

What is claimed as new is—

1. In a confection-molding machine, the combination, with a frame, a tray moving intermittently thereon, a hopper, tubes depending therefrom above said tray, and means for discharging intermittently from said tubes, of levers pivoted to said frame and having slotted upper ends, a cutter-bar mounted in said slots and moving on the tray beneath the lower ends of said tubes, and a rotating shaft for operating said levers, all as and for the purpose set forth.

2. In a confection-molding machine, the combination, with the hopper having discharge-tubes, the vertically-moving cross-head above said hopper, the plungers in said tubes, the plunger-rods leading therefrom through said cross-head and adjustably connected therewith, worms on said rods above the plungers, and gears splined on said plunger-rods and engaging each other, of a shaft journaled in a bracket on said cross-head and having a gear engaging one of those on the plungers, a ratchet-wheel keyed to said shaft, a large gear on the shaft adjacent said ratchet-wheel and having a pawl engaging the same, a rack-bar engaging the teeth on said large gear, and connections between said rack-bar and a moving part of the machine, the whole being timed so that the rack-bar shall descend as the plunger rises, substantially as described.

3. In a confection-molding machine, the combination, with the hopper having a discharge-tube, the vertically-moving cross-head over the hopper, the plunger in said tube, a plunger-rod leading therefrom through the cross-head, and a worm on said rod above the plunger, of a bearing in the cross-head surrounding said rod, a gear above said bearing splined on the rod, a retaining-bar above said gear, adjustable stops above the bar and below the bearing, and means for turning said gear during the ascent of the cross-head, substantially as described.

4. In a confection-molding machine, the combination, with the hopper having a discharge-tube, the vertically-moving cross-head above said hopper, a plunger in said tube, the plunger-rod leading therefrom through the cross-head, and a worm on said rod above the plunger, said plunger-rod having a threaded upper end and a groove in its body, of a bearing in the cross-head surrounding the rod, a gear having a depending hub resting on said bearing, a set-screw through said hub engaging said groove, a retaining-bar above said gear connected at its ends to the cross-head, a nut, and a jam-nut on the upper end of the plunger-rod above said retaining-bar, a collar on the plunger-rod below the bearing, a set-screw through said collar rendering it adjustable on said rod, and means for turning said gear during the ascent of the cross-head, as and for the purpose described.

5. In a confection-molding machine, the combination, with the hopper having the discharge-tube, a plunger in said tube, a vertically-moving cross-head above the hopper, a plunger-rod extending through said cross-head and connected with said plunger, and a worm on said rod above the plunger, of a bearing surrounding said rod and having an enlarged upper end resting on the upper side of said cross-head, a gear above said bearing splined on the rod, means for rotating said gear during the ascent of the cross-head, a retaining-bar pivoted at one end to the cross-head and having a notch in its body loosely engaging the plunger-rod just above said gear, and a set-screw detachably connecting the other end of said retaining-bar to the cross-head, as and for the purpose set forth.

6. In a confection-molding machine, the combination, with a hopper, a depending discharging-tube communicating with the interior thereof, and a cup depending from said tube and having a discharge-mouth, of a sliding valve fitting within said tube, a plunger-rod reciprocating vertically through said valve, a valve on said rod above the sliding valve and adapted to close the opening through the same, and a foot at the lower end of said rod adapted to raise the sliding valve without closing the opening therethrough, as and for the purpose set forth.

7. In a confection-molding machine, the combination, with a hopper, a depending discharging-tube communicating with the interior thereof, and a cup depending from said tube and having a contracted mouth, of a sliding valve within said tube, a plunger-rod reciprocating vertically through said valve, a semi-spherical valve on said rod above the sliding valve for closing the opening through the latter, a foot at the lower end of said rod for raising the sliding valve without closing its opening, a spiral worm on said rod above the valves, and means for turning the rod and causing the worm to feed downwardly during the ascent of the rod, as set forth.

8. In a confection-molding machine, the combination, with the hopper having discharge-tubes, sliding valves within said tubes, plunger-rods extending through said valves and carrying semi-spherical valves above and triangular feet below the same, gears splined on said rods and in engagement with each other, a large gear connected to one of said gears, and a rack carried by the hopper and engaging said large gear, of means, substantially as described, for reciprocating said rods vertically, as and for the purpose set forth.

9. In a confection-molding machine, the combination, with the hopper having discharge-tubes, sliding valves within said tubes, plunger-rods extending through said valves and carrying semi-spherical valves above and triangular feet below the same, gears splined on said rods and in engagement with each other, a large gear connected to one of said gears, and a rack engaging said large gear, of means, substantially as described, for reciprocating said rods vertically, longitudinal rotating shafts through the hopper carrying stirring-paddles, a crank on the end of one of said shafts, and a pitman connecting said crank with rack, the parts being timed so that the rack moves vertically and oppositely to the movements of said larger gear, as and for the purpose set forth.

10. In a confection-molding machine, the combination, with the hopper having discharge-tubes, sliding valves within said tubes, plunger-rods extending through said valves and carrying semi-spherical valves above and triangular feet below the same, a vertically-reciprocating cross-head, in which said rods are journaled, gears splined on said rods and in engagement with each other, and a bevel-gear on one of the end rods, of a bracket mounted on said cross-head, a shaft journaled therein and carrying a bevel-gear meshing with that on the end plunger-rod, a ratchet-wheel on said shaft, a large gear mounted loosely on the shaft adjacent the ratchet-wheel and having a pawl engaging the same, and a rack connected with the hopper and engaging said large gear, as and for the purpose hereinbefore set forth.

11. In a confection-molding machine, the combination, with the hopper having discharge-tubes, the vertically-moving cross-head above said hopper, the plungers in said tubes, the plunger-rods leading therefrom and connected therewith, and worms on said rods above the plungers, of means for turning said plunger-rods during the ascent of the cross-head, substantially as described.

12. In a confection-molding machine, the combination, with a hopper and a depending discharging-tube communicating with the interior thereof, of a sliding valve fitting within said tube, a plunger-rod reciprocating vertically through said valve, a semi-spherical valve on said rod above the sliding valve and adapted to close the opening through the same, a spiral worm on said rod above the valves, and means for turning the rod and thus cause the worm to feed downward during the descent of the rod, as and for the purpose set forth.

13. In a confection-molding machine, the combination, with the hopper having discharge-tubes, the vertically-moving cross-head above said hopper, the plungers in said tubes, the plunger-rods leading therefrom to said cross-head and adjustably connected therewith, worms on said rods above the plungers, and gears on said plunger-rods and engaging each other, of a shaft having a gear engaging one of those on the plungers, a large gear on the shaft, a rack-bar engaging the teeth on said large gear, and connections between said rack-bar and a moving part of the machine, the whole being timed so that the rack-bar shall descend as the plunger rises, substantially as described.

14. In a confection-molding machine, the hopper having the discharge-tubes, the plungers working in the tubes, the plunger-rods leading from the plungers, valves located in the tubes and plungers, spiral worms provided on the plunger-rods above the valves, and gearing for rotating the plunger-rods, as set forth.

In testimony that I claim the foregoing as my own I have hereto affixed my signature in presence of two witnesses.

JOSHUA CLAY RUBY.

Witnesses:
 W. T. WOODRUFF,
 ROBT. K. BECK.